United States Patent
Gardner et al.

(10) Patent No.: US 9,043,031 B1
(45) Date of Patent: May 26, 2015

(54) LOW-COST, HIGH-RELIABILITY CONTROLLER FOR REMOTELY OPERATED ROBOTS

(71) Applicant: Westlake & Eanes Science & Technology Association, Austin, TX (US)

(72) Inventors: Rachel Gardner, Austin, TX (US); Akshay Prakash, Austin, TX (US); Benjamin Jared Gorr, Austin, TX (US); Eric J. Rothfus, Austin, TX (US)

(73) Assignee: Westlake & Eanes Science & Technology Association, Austin, TX (US)

( * ) Notice: Subject to any disclaimer, the term of this patent is extended or adjusted under 35 U.S.C. 154(b) by 0 days.

(21) Appl. No.: 14/185,548

(22) Filed: Feb. 20, 2014

(51) Int. Cl.
  *G05D 1/00* (2006.01)
  *G05D 1/02* (2006.01)
(52) U.S. Cl.
  CPC ............ *G05D 1/0016* (2013.01); *G05D 1/0022* (2013.01); *G05D 1/028* (2013.01); *Y10S 901/01* (2013.01); *Y10S 901/50* (2013.01)
(58) Field of Classification Search
  CPC .................... B25J 13/006; G05B 2219/13019; G05B 2219/23279; G05B 2219/23283; G05B 2219/25204; G05B 2219/31369; G05B 2219/36231; G05B 2219/43051
  USPC ......... 700/245, 257, 264; 701/2; 901/1, 6, 50; 318/568.12, 568.13, 568.17, 581; 463/36, 40
  See application file for complete search history.

(56) References Cited

U.S. PATENT DOCUMENTS

| | | | | |
|---|---|---|---|---|
| 4,589,068 | A * | 5/1986 | Heinen, Jr. ..................... | 717/127 |
| 6,079,025 | A * | 6/2000 | Fung .............................. | 713/323 |
| 2005/0004708 | A1 | 1/2005 | Goldenberg et al. | |
| 2007/0242643 | A1* | 10/2007 | Chandra et al. ............... | 370/338 |
| 2008/0269949 | A1* | 10/2008 | Norman et al. ................ | 700/248 |
| 2009/0216981 | A1* | 8/2009 | Diefenbaugh et al. ........ | 711/163 |
| 2009/0271038 | A1 | 10/2009 | Song et al. | |
| 2011/0010006 | A1 | 1/2011 | Tani et al. | |
| 2011/0298613 | A1* | 12/2011 | Ben Ayed ................ | 340/539.11 |
| 2012/0017100 | A1* | 1/2012 | Petit et al. ..................... | 713/300 |
| 2012/0072023 | A1 | 3/2012 | Ota | |
| 2014/0249676 | A1* | 9/2014 | Florencio et al. ............. | 700/259 |

FOREIGN PATENT DOCUMENTS

EP     1712970 A2     10/2006

OTHER PUBLICATIONS

Smith, Roger D., "Medical Robotic and Telesurgical Simulation and Education Research", Sep. 2012, Florida Hospital's . Nicholson Center, p. 5, http://www.dtic.mil/dtic/tr/fulltext/u2/a566554.pdf.*
http://web.archive.org/web/20120529061143/http://www.iogear.com/product/GUWH204KIT/), May 29, 2012, p. 1.
http://www.iogear.com/product/GUWH204KIT/, May 15, 2014, pp. 1-4.

\* cited by examiner

*Primary Examiner* — Spencer Patton
(74) *Attorney, Agent, or Firm* — Pillsbury Winthrop Shaw Pittman LLP

(57) ABSTRACT

Provided is a device for wirelessly controlling robots suitable for competition or educational purposes, the device including: an input module configured to receive commands from a human user interface, the human user interface sending signals indicative of inputs by a user to control a robot; a protocol translator configured to translate the received commands into a protocol to which the robot is responsive; a wireless output module configured to wirelessly transmit the translated commands to the robot such that the robot executes the commands.

25 Claims, 4 Drawing Sheets

LOW-COST, HIGH-RELIABILITY CONTROLLER FOR REMOTELY OPERATED ROBOTS

BACKGROUND

1. Field

The present invention relates generally to robotics and, more specifically, to wireless controllers for robots, such as competition and educational robots.

2. Description of the Related Art

As computational power increases and the quality of sensors and actuators improve, society is becoming increasingly reliant upon autonomous and semiautonomous robots, such as electromechanical and pneumatic machines guided by computer programs. As a result of these trends, robots are expected to undertake an increasing number of mundane, dangerous, or otherwise undesirable tasks for human beings, particularly as the cost of such machines decreases.

In view of the increasing role of robots, and the related need for more science, technology, engineering, and math graduates, a number of public and private organizations strive to train and engage the next generation of technically-inclined students who will program and develop such robots. As part of this effort, it is increasingly common to teach people how to design, program, and operate robots with educational robots and robotics competitions. In one prominent example, an organization named FIRST organizes robotics competitions and promulgates rules for the same. Competing teams include grade school or high school students who design and program robots that compete to achieve various objectives. Generally, during a competition, a given team has a human operating a user interface, such as a hand-held game controller, which is coupled to a laptop computer that wirelessly sends commands to a robot designed or (i.e., and/or) programed by the team.

Existing hardware typically used in competitions is deficient in a number of respects. Using a laptop computer as the interface between the hand-held game controller and the robot presents a number of problems relating to cost, complexity, and reliability. For example, laptop computers are relatively expensive compared to the budgets with which robotics teams operate, particularly in underprivileged communities, thereby deterring some schools from adding a robotics training program. Additionally, laptop computers are relatively large and heavy, occupying scarce space allotted to a team within a classroom, workshop, or competition environment. Laptop computers are also unreliable for competitions, as such computers are relatively fragile and complex systems with a large number of settings, software updates, and interacting programs and components that can interact in an unpredictable fashion, particularly during a competition, thereby interfering with a team's performance. In particular, wireless connections provided by laptops are relatively complex to configure and maintain over time, in part because laptops are designed to accommodate many other use cases that require a relatively large number of user configurable settings be exposed, some of which can interfere with a wireless connection in a non-intuitive fashion. Finally, laptops are power-hungry devices that consume a relatively large amount of electrical power to perform tasks unrelated to controlling a robot, e.g., running an operating system and maintaining unneeded network connections, peripherals, and background processes. Such power consumption can require large batteries that add bulk to a team's equipment and present another failure mode in the event that the battery is exhausted during the competition.

SUMMARY

The following is a non-exhaustive listing of some aspects of the present techniques. These and other aspects are described in the following disclosure.

Some aspects include a device for wirelessly controlling robots suitable for competition or educational purposes, the device including: an input module configured to receive commands from a human user interface, the human user interface sending signals indicative of inputs by a user to control a robot; a protocol translator configured to translate the received commands into a protocol to which the robot is responsive; a wireless output module configured to wirelessly transmit the translated commands to the robot such that the robot executes the commands.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
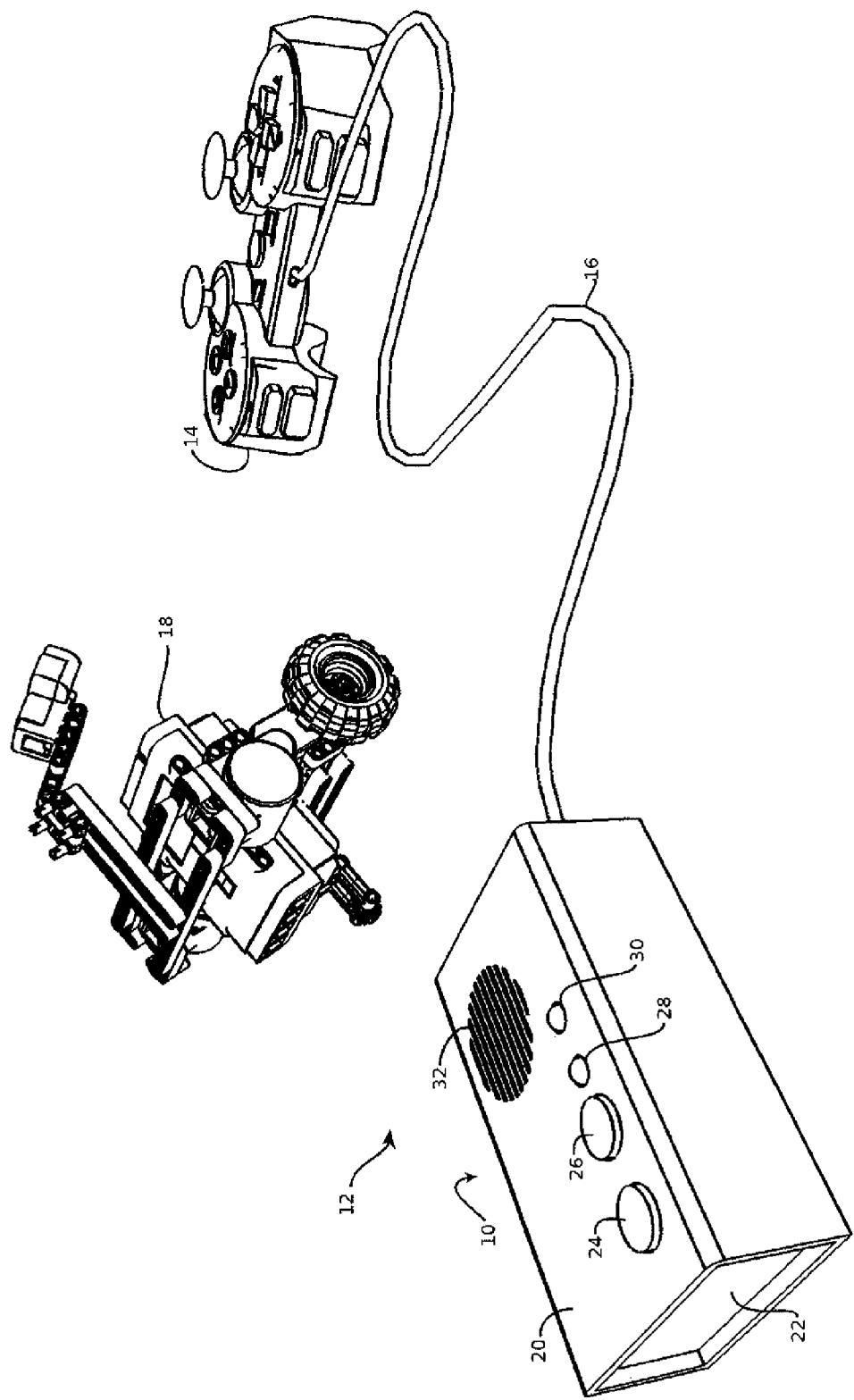
FIG. 1 is a perspective view of an example of a robot controller in accordance with some embodiments of the present inventions.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Some (and in some cases all) of the above-mentioned problems are mitigated by various embodiments of the exemplary robot controller 10 shown in FIG. 1. As explained in greater detail below, embodiments of the controller 10 may include specialized, relatively low-power, relatively inexpensive, and relatively easy to configure dedicated hardware and software for controlling a robot wirelessly, and in particular, for doing so in accordance with particular design constraints imposed by competition rules. Eliminating unneeded bulk, functionality, and complexity present in more commonly used laptop computers is expected to address many of the above-mentioned problems. Further, embodiments support pre-configured wireless connections that are relatively reliable, simple to establish, and are configurable in ways relevant to competition environments with high contention for the wireless medium. Some embodiments further provide for competition-specific commands that allow a team to simulate a competition environment for testing of robots. And some embodiments provide these features and advantages in a relatively low-cost and small device by using dual-purpose chorded button inputs and using relatively low-powered hardware.

While the present techniques are described with respect to educational and competition use cases, it should be noted that applications are not so limited. Many challenges presented in these environments have, by design, direct analogs in industry, and it is expected that many of the presently described techniques will have uses that extend to industrial applications. Further, it is important to note that not all of the above-mentioned problems are addressed by all embodiments, as some embodiments reflect various engineering and cost trade-offs that cause those embodiments to address only some of the above-mentioned problems. Moreover, it should be noted that the present techniques address problems in the field that are nascent and will likely seem more apparent in the future, as use of robots is expected to become substantially more common. Accordingly, the reader should keep in mind that recognition of these problems at this time is an important aspect of providing the presently described solutions to such problems, and readers should not assume that these problems were readily apparent to those skilled in the art at the present time, regardless of how apparent such problems become in the future.

The robot controller 10 is best understood in view of an exemplary environment 12 in which the robot controller 10 operates. In this example, the robot controller 10 is connected to a hand-held game controller 14 (or other type of user interface, such as a keyboard, mouse, touchpad, motion sensing device, or the like) by a wired connection 16, in this case a universal serial bus (USB) wired connection. In this example, the hand-held controller 14 includes a plurality of buttons and joysticks, manipulation of which by a human operator may cause electrical signals indicative of such manipulation to be conveyed via the wire 16 to the robot controller 10. In some cases, such commands are conveyed serially via the wire 16 as a sequence of codes, each code indicative of a particular user interaction, such as a code indicative of a user down press or release of a given button, or a code indicative of some movement of a joystick. In some cases, the hand-held game controller 14 includes a power supply, a microcontroller, and a wired interface for communicating on the wire 16, such as a USB interface.

In this example, the environment 12 further includes a robot 18 configured to be wirelessly connected to the robot controller 10 and controlled by the hand-held controller 14 via the wireless connection. The robot 18 may include a portable on-board power supply, a processor, memory, sensors, and actuators communicatively coupled to one another. In some examples, the processor may execute a routine stored in the memory to cause the actuators to take action based on data acquired by the sensors.

The robot 18 may further include a wireless interface, such as a Bluetooth™ interface or a wireless local area network interface, for example, an IEEE 802.11 compliant WiFi™ or WiFi Direct™ interface for communicating with the robot controller 10 wirelessly. In some cases, the wireless connection is direct, for example, a direct Bluetooth™ connection or a Wi-Fi Direct™ connection between the robot controller 10 and the robot 18, or in some cases, the wireless connection may be routed through other devices, such as a wireless router or relay station or via a mesh network, for instance, with a ZigBee™ protocol or other IEEE 802.15 compliant connection. Or in some embodiments, the connection between the robot controller 10 and the robot 18 may be wired.

Examples of the robot 18 may be built using, for instance, the Lego Mindstorm NXT™ programmable robotics kit available from the Lego Group of Billund, Denmark. Such kits may include a computational unit referred to as an intelligent brick (or other control module) having ports for interfacing with multiple sensors and motors (or other actuators) and having a display, buttons, and various computing hardware, such as a microcontroller, persistent and dynamic memory, and a Bluetooth™ interface or other wired or wireless interface. In some cases, the wireless connection to the robot from the robot controller 10 is with such an intelligent brick. The robot 18 may execute an event handler that receives commands wirelessly conveyed to the robot 18 and executes various routines in response to such commands, for example, a command to drive left, drive right, drive forward, drive backwards, stop operations, start operations, or the like. In some cases, competition or educational protocols require that the first command received and executed by the robot 18 before other commands that drive an actuator be a start command according to a protocol specified by the organization, so that organizers of a competition or a teacher can control when operation of the robot begins.

Functional logic (e.g., circuitry, code, or combinations thereof) of the robot controller 10 is described in greater detail below, after describing aspects of the physical design of this exemplary embodiment. In the present example, the robot controller 10 has a generally rectangular parallelepiped shape, for example, a rectangular cuboid shape, and may be sized to be a portable, hand-held, pocketable device. In some cases, the longest dimension of the robot controller 10 is less than 15 cm, for example, less than 10 cm. In this case, the robot controller 10 includes a case 20 forming a generally tubular shape with the sidewalls 22 generally capping the end of the tubular shape in a recessed region. In some embodiments, the case 28 is formed from a thermoset plastic. The illustrated case 28 includes apertures for an action button 26, a power/kill-switch button 24, a power-on indicator light 28, and a wireless-connection status indicator light 30. In some embodiments, the buttons 24 and 26 are single pole, single throw on-off switches with a resilient member, such as the spring, returning the buttons 24 and 26 to an open state when not actively being pressed by a user. Further, in some embodiments, the lights 28 and 30 are light emitting diodes, though other types of lights or displays are contemplated, for example, black-and-white or color liquid crystal displays. In this example, the case 20 further includes a speaker grating 32 formed by an array of apertures through the case 20 for transmitting sound from a speaker, or some embodiments may include a case 20 with sufficient sound transmissibility that no grating is included, which is not to suggest that other features may not also be omitted in some embodiments. Various sounds may indicate (1) connection, (2) error, (3) mode switch, (4) robot start, (5) robot stop, (6) power down, (7) power up, and (8) configuration changes. On the side of the robot controller 10 opposite the side wall 22, a similar sidewall is disposed with ports for a USB wired connection and a serial interface port (e.g., a DE-9 connector or the like), in some embodiments. In some cases, sidewall 22 includes an opening through which a battery may be accessed, e.g., a batter door through which a battery may be removed and replaced with a different battery. Various circuit boards, chips, and other components described below may be disposed in the case 20.

Figure 2:
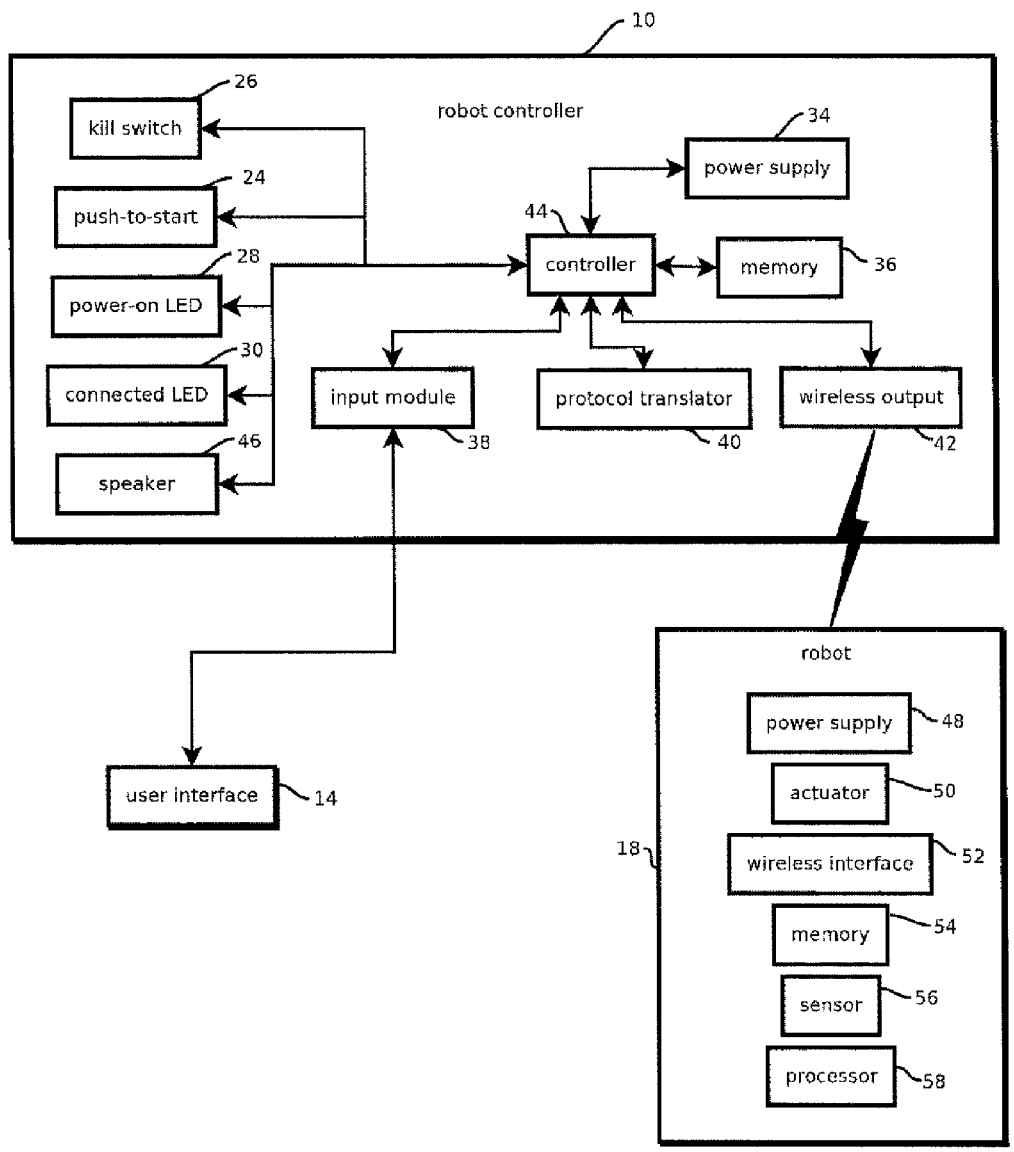
FIG. 2 is functional block diagram of the robot controller of FIG. 1.

FIG. 2 shows a functional block diagram of an example of the robot controller 10. While the functionality is shown organized in discrete functional blocks for purposes of explaining the software and hardware by which the robot controller 10 may be implemented in some embodiments, is important to note that such hardware and software may be intermingled, conjoined, subdivided, replicated, or otherwise differently arranged relative to the illustrated functional blocks.

In this example, the robot controller 10 may include a power supply 34, memory 36, an input module 38, a protocol translator 40, a wireless output module 42, a controller 44, and a speaker 46. In some embodiments, the input module 38 may receive commands from the user interface 14 (e.g., via a wired connection to the hand-held game controller of FIG. 1), the protocol translator 40 may translate those receive commands into a protocol to which the robot 18 is responsive, and the wireless output module 42 may wirelessly convey those commands to the robot 18. The controller 44 may coordinate the operation of these components 38, 40, and 42, and the memory 36 may store values referenced during such operations, such as tables for translating between commands protocols, wireless protocol information for communicating with the robot 18, and program state of routines executed by the robot controller 10. The power supply 34 may power such operations.

In some embodiments, the power supply 34 includes a battery, such as a lithium-ion or nickel metal hydride battery that is replaceable. Other embodiments may include other types of power supplies, such as fuel cells, solar power supplies, and power adapters for receiving electric grid power from a wall outlet or power from a powered USB connection. In some cases, the power supply 34 is a portable power supply, such as a battery of a size and weight small enough that the robot controller 10 can be held in a user's hand. In some embodiments, the power supply is smaller than 10 volts with a capacity of 1200 mAh or less, such as a commercially available 9 volt lithium ion battery.

The illustrated memory 36 may include dynamic memory, such as static random access memory or dynamic random access memory that is relatively fast but does not retain information persistently after power is withdrawn, as well as persistent memory, such as flash memory or a magnetic hard drive that retains information in the absence of electrical power. In some cases, the memory 36 is distributed among a plurality of components, including registers and cache memory in a processor as well as programmable registers in various chips for interfacing with the user interface 14 or the robot 18. In some cases, the amount of memory 36 is less than 256 kB to maintain a relatively low cost for the robot controller 10 and a relatively simple operating environment with a relatively small memory address space. In some cases, the memory 36 may include non-volatile memory (such as flash memory or an EEPROM) or (i.e., and/or) volatile memory. The non-volatile memory may be on a distinct chip from the volatile memory in some cases.

The illustrated input module 38 may include any of a variety of different types of interfaces for communicating with user interface 14, including a USB interface or an RS232 serial interface that offload aspects of complying with lower layer protocols, such as the physical layer and the data link layer, from the controller 44. In some cases, the input module 38 supports a wired connection to the user interface 14 and includes circuitry operative to receive commands encoded in a series of bits, deserialize the commands, and provide the received command to the controller 44 for conveyance to the protocol translator 40. Commands may be provided to the controller 44 with a number of techniques, including via an interrupt signal from the input module 38 or by the controller 44 periodically polling the state of registers in the input module 38 in which new commands are flagged and recorded. Or in some cases, the input module 38 includes logic (e.g. circuitry, code, or a combination thereof) operative to periodically poll a register through which commands are received or are indicated for the arrival of new commands from the user interface 14, such commands being indicative of a user, for example, pressing a button, manipulating a joystick, or the like to express an intent that the robot 18 take some action. In some cases, the registers that are polled are resident in the input module 38, or the input module 38 may poll the user interface 14 by transmitting a request for data indicative of user interactions.

In some cases, the protocol translator 40 is operative to receive commands obtained by the input module 38 and translate those commands into a protocol to which the robot 18 is responsive. Often digital codes output by a hand-held controller in response to user interactions do not correspond to digital codes intelligible to the robot. For instance, pressing a given button on the user interface 14 may cause a packet of data to be sent to input module 38, the packet including data encapsulating a payload with a code indicative of what action the user took or is taking. The received code likely is different from a code that corresponds to the robot's protocol for commands, or set of codes corresponding to various instructions to which the robot 18 is responsive. Accordingly, some embodiments translate the received code into a robot command protocol.

To this end, in some embodiments, the protocol translator 40 may retrieve a mapping between received commands and robot-protocol commands from the memory 36. For example, a received command indicating that a given button on the user interface 14 was pressed may be translated into a robot protocol command indicating that the robot is commanded to stop driving the rotation of a given motor. The corresponding data structure in memory 36 indicative of such a mapping may include a table of codes output from the user interface 14 when the user interacts with a given input, such as a button or joystick, and the corresponding robot protocol commands for such codes, such as commands to increase a motor speed, decrease a motor speed, initiate a routine to be executed by the robot, stop a routine being executed, adjust a parameter in a routine being executed, step through a breakpoint in code being executed in a debugging use case, or the like. Examples of codes output by the user interface 14 are generally available from the manufacturer of the user interface or can be reverse engineered using open source tools, such as the Wireshark packet analyzer to capture codes output in response to given actions by the user. Similarly, examples of robot protocol commands are generally available from the manufacturer of robot components, and may be expressed, for example, as a digital value corresponding to a robot executable command (which may include a message) to be conveyed to the robot 18 wirelessly.

In some cases, command translation entails more than accessing in memory 36 an unchanging, one-to-one correspondence between a received code and a translated code. In some cases, different profiles or (i.e., and/or) configurations may be stored in memory 36 (e.g., in a non-volatile portion of memory 36), with different mappings between input and translated codes associated with each profile, in which case, the translation may include identifying a mapping based on a current profile (e.g., selected by the user) before retrieving the translated code. Different profiles may be selected for different use cases (e.g., competition, configuration, and training) and different robots. In another example, the translated command may depend on a previous sequence of commands selected by the user. For instance, the translated command for a given button press on the user interface 14 may depend on whether the user has previously pressed a start button (triggering the use of a first profile) and has not since pressed a stop button (triggering the use of a second, different profile). Using such selectable profiles is expected to yield a more expressive user interface and make the robot controller applicable in a wider set of use cases, though not all embodiments necessarily provide these benefits. Further, in some cases, a command sent to the robot may engage a different set of robot commands and cause the command translator to use a different profile. The resulting translated command may be conveyed by the controller 44 to the wireless output 42 for transmission.

In some embodiments, the wireless output 42 is operative to convey the translated command to the robot 18 wirelessly. In some cases, the wireless output 42 includes a medium access controller (MAC) and a transceiver (PHY) for managing contention on the medium and conveying such messages, respectively. In some cases, the wireless output 42 may include a Bluetooth™ wireless adapter operative to communicate with the robot 18 wirelessly via Bluetooth™ signals. Or in other cases, the wireless output 42 may include an 802.11 compliant adapter, such as a Wi-Fi™ or Wi-Fi Direct™ capable adapter for communicating with the robot 18. Other examples include IEEE 802.15 compliant adapters for, for instance, communicating wirelessly via mesh networks formed with multiple robot controllers or robots. In some cases, the wireless output 42 includes an optical link adapter for transmitting, for instance, infrared messages to the robot 18. In some cases, the wireless output 12 may be operative to determine when the wireless medium is free for transmission, package commands to be transmitted with error correction codes in the appropriate protocol for the physical layer or (i.e., and/or) data link layer, transmit the packaged commands, and receive acknowledgment signals indicating that the transmitting commands were received by the robot 18. Some embodiments may retransmit commands (or portions of commands when commands span packets) upon the robot 18 indicating that the received signal was internally inconsistent as indicated by the error correction codes, or embodiments may retransmit commands upon determining that an acknowledgement signal was not received within some threshold duration of time.

Further, in some embodiments, the wireless output 42 may be operative to retrieve a user-configurable transmission strength value from memory 36 indicative of the strength with which transmission is to occur and transmit at a strength corresponding to that value. In some cases, the transmission strength is user adjustable such that users may lower the transmit strength during operation in crowded competition environments to avoid interference with other teams or users may increase the transmit strength when operating over relatively large distances. Similarly, some embodiments may include other user adjustable transmit parameters, such as frequency, time division multiplexing parameters, code division multiplexing parameters, or combinations thereof for user adjustments to reduce interference with others operating nearby. In some cases, the wireless output 42 may delay transmission of commands by a user-configurable duration of time to simulate lag that occurs during competition for training a human operator under more realistic circumstances. Upon receiving a command for transmission, embodiments may start a timer, e.g., a clock-cycle counter, and determine whether that timer has exceeded the user-specified lag time before transmitting the command.

The controller 44 may coordinate the operation of the other components of the robot controller 10, in some embodiments. In some cases, the controller 44 may couple to a serial port or USB interface by which the robot controller 10 may be configured by users, e.g., by users writing to flash memory addresses in memory 36 corresponding to configurable options. For example, the controller 44 may be operative to receive transmit strength values (or other transmit parameters) from such an interface and store the appropriate value in memory 36 for use by the wireless output 42. In another example, the controller 44 may be operative to update values in memory 36 mapping signals from the user interface 14 to robot protocol commands. In some cases, memory 36 may include multiple profiles, each profile including such a mapping, values indicating when a mapping is to be used, and transmit parameters that are user configurable. The controller 44 may indicate which profile is to be used by the other components, such that the robot controller 10 may maintain multiple profiles in memory for different environments, use cases, and robots.

The controller 44 may further interface with the buttons 24 and 26, lights 28 and 30, and speaker 46 of the robot controller 10 for physically receiving commands and providing information relating to the operation of the robot controller 10. For example, the controller 44 may sense (e.g., poll, receive interrupts indicative of, or otherwise monitor) the state of the kill switch 24 and the action button 26, and the controller 44 may execute various routines in response to the state of these buttons 26 and 24. Examples of such routines are described in greater detail below with reference to the flowchart of FIGS. 3 and 4. In response to the button 24 being pressed, embodiments may cause a command to be sent to the robot 18 that stops operation of the robot, and the button 26, when pressed, may cause a start signal to be sent. The controller 44 may further provide indications about the state of the robot controller 10 via the lights 28 and 30 and sounds emitted from the speaker 46. Providing a relatively limited range of user inputs and outputs for the robot controller 10 via buttons 24 and 26, lights 28 and 30, and speaker 46 simplifies the robot controller 10, such that some of the above-mentioned problems with laptops are mitigated while still providing an appropriate amount of user configurability, which is not to suggest that all such embodiments must address all of the above-mention problems with using laptops for this purpose.

As noted above, the robot controller 10 may communicate with a robot 18 having various components, examples of which are illustrated in FIG. 2, including a power supply 48, an actuator 50 (and likely multiple actuators), a wireless interface 52, memory 54, a sensor 56 (and likely multiple sensors), and a processor 58. In some cases, the robot 18 may execute routines stored in memory 54 with the processor 58 and command the actuator 50 to take various actions based on determinations made in the course of such routines. The routines executed by the robot 18 may include an event handler that receives commands from the robot controller 10 via the wireless interface 52 and executes various routines in response to such events to effectuate the commands.

In one example, a startup routine for the robot 18 includes a wait-for-start determination that precedes other actions (for instance, all other physical actions involving actuators). In some cases, the operator of a competition or a teacher may wirelessly transmit a start signal that is received via the wireless interface 52, and in response, the robot 18 may determine that the start signal has been received and proceed with the routine. These start signals may be used so that an administrator overseeing the competition or classroom can control the operation of the robots to some degree. However, when using the robot outside of the classroom or a competition, the start signal may be absent, and different code that does not wait for a start signal may be needed, causing a team to use different and untested code at the time of a competition or in a classroom.

To address this problem, some embodiments simulate the start signal for testing. In another use case, an operator of the robot controller 10 may press the action button 26, and a start signal, e.g., a signal matching those used in competitions, may be sent to the wireless interface 52 to cause the robot 18 to start operation. Thus, operators of the robot controller 10 may simulate a competition or educational environment with this feature, in some embodiments. Simulating such start signals is expected to provide for more realistic testing of the robot's software, and reduce the need to modify such software during competition, thereby reducing errors during competitions. Again, though, not all embodiments necessarily provide this benefit, as other aspects of the present techniques are independently useful and various engineering and cost tradeoffs are contemplated.

In some cases, the functionality illustrated in FIG. 2 may be implemented with relatively inexpensive hardware. Embodiments may include a relatively small system printed circuit board (e.g., less than 4 inches of board width, such as approximately 2.4 inches of board width, and less than 5 inches of board length, such as approximately 2.75 inches of board length) to reduce costs of the system board and size of the robot controller 10. The system board may also have four or fewer layers with conductive traces, e.g., a board with three such layers, to reduce costs of the system board. The robot controller 10 may further include a USB host controller (such as the VDIP2 USB host controller available from FTDI Ltd. of Glasgow, United Kingdom) for providing a USB adapter and some of the functionality of the input module 38; a microcontroller (such as the Arduino™ Pro Mini 328 available from SparkFun Electronics) for coordinating the operation of the other components and providing some functionality of the protocol translator 40 and the controller 44; and a Bluetooth™ radio (such as the RN42 Bluetooth™ radio available from Microchip.com's website) for providing some of the functionality of the wireless output 42. Collectively, these components are relatively inexpensive while still providing functionality that is useful for operating robots, particularly in educational and competition environments. In some embodiments, these components are configured with built in integrated board bring-up and manufacturing test. Embodiments may use relatively little power, for instance, less than 300 mA of power, less than 200 mA of power, or less than 100 mA of power, depending on the feature set and configuration. To this end, some embodiments may use a relatively low-power microprocessor, e.g., an 8-bit or 16 bit microprocessor running at a clock speed of less than 64 MHz, e.g., at approximately 16 MHz.

In some cases, multiple instances of the robot controller 10 may operate in the same or overlapping wireless environments. Some embodiments may store a user-adjustable (or pre-set) unique identifier of each instance of robot controller 10, and these identifiers may be stored in memory of the respective robots 18, such that each robot may use the controller identifier to communicate with the appropriate controller even when wireless signals overlap and multiple controllers are in range. The identifier may be stored in memory of each robot controller 10 and may be conveyed to the respective robot 18 using the pairing process described below or by manually entering the controller identifier into memory of the robot, e.g., by including the identifier in a program executed by the robot.

Figure 3:
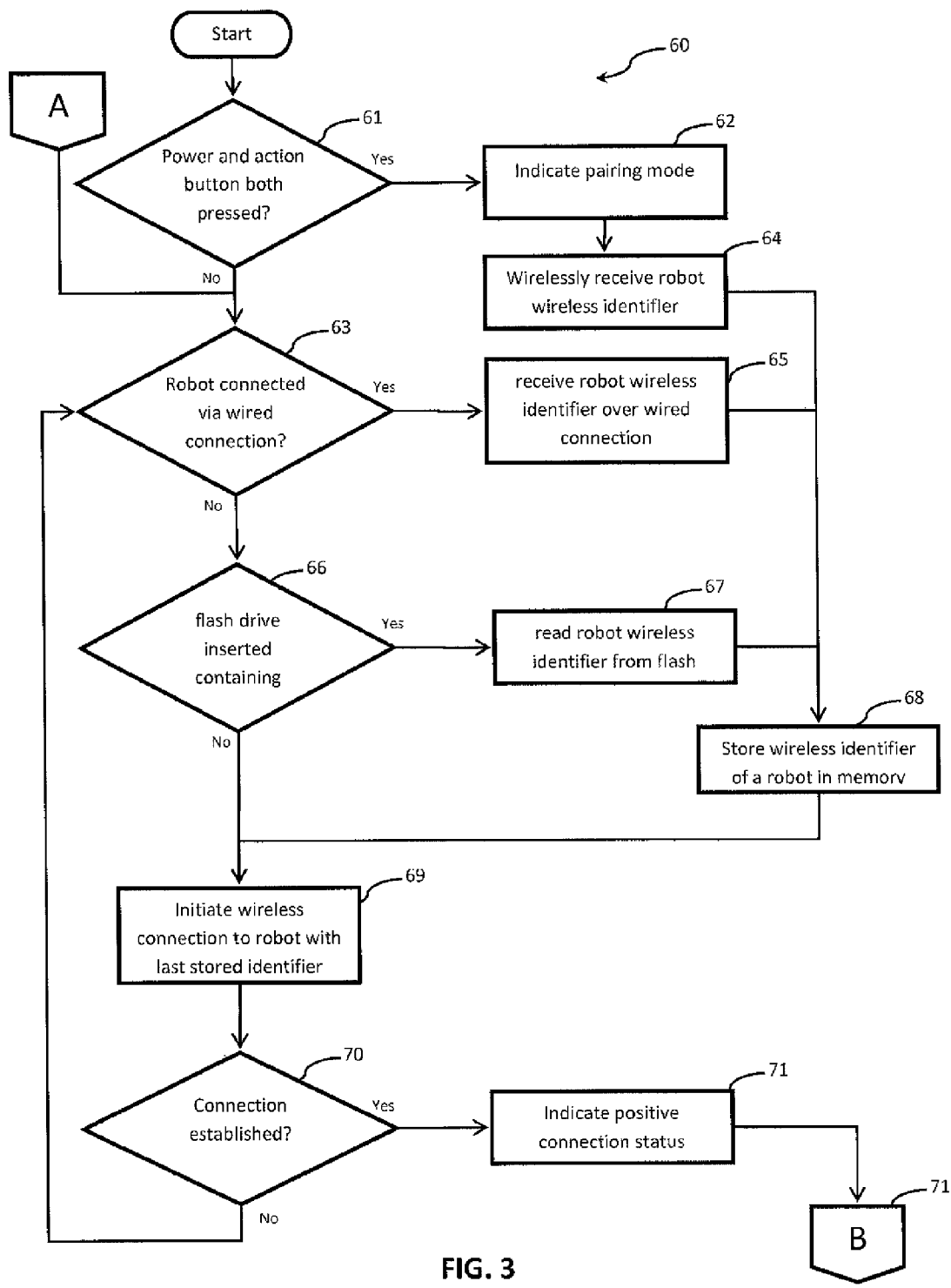
FIGS. 3 and 4 are a flow-chart showing an example of a process executed by the robot controller of FIG. 1.
Figure 4:
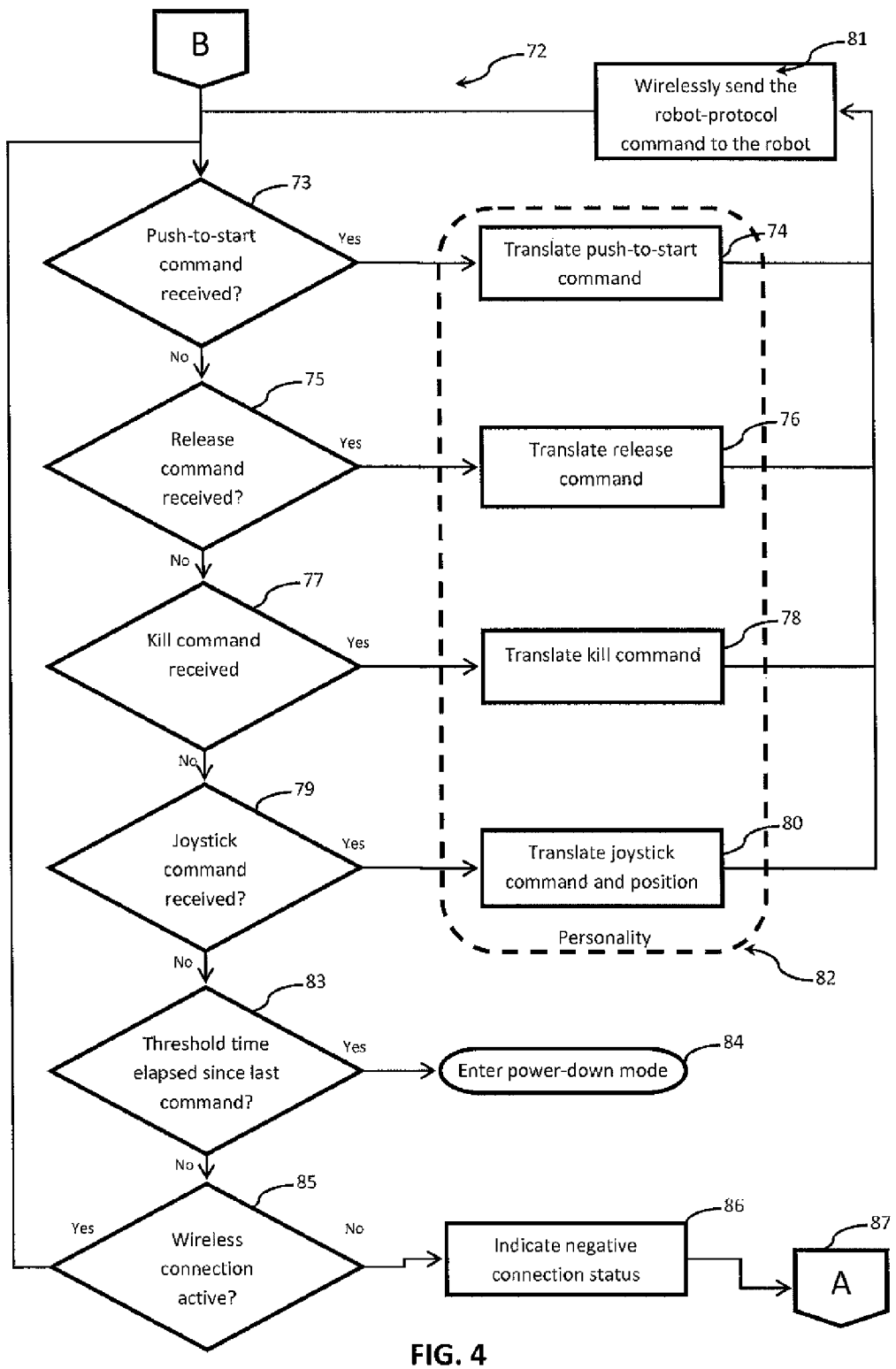

FIGS. 3 and 4 show an example of a process 60 (continued as 72 in FIG. 4) for controlling a robot that may be performed by the robot controller 10, though embodiments of the process 60 are not limited to the above-described implementations. In this example, the process 60 includes determining whether the power and action buttons of controller 44 of FIG. 2 are both being pressed at the same time, as indicated by block 61. In response to determining that both buttons are being pressed, the process 60 may indicate its entry into pairing mode 62 (and a controller performing the process may enter a pairing mode in which a robot or other device is paired with such a controller) and proceed to wirelessly receive a robot wireless identifier, as indicated by block 64. In some cases, the above-described robot 18 may be manually (e.g., by a human interfacing with controls physically coupled to or on the robot, like by pressing a button on the robot) instructed to transmit a pairing signal including a Bluetooth™ identifier of the robot, and that signal may be received in step 64 (e.g., by a controller executing process 60). The received wireless identifier may be stored in non-volatile memory, as indicated by block 68, for example, in the non-volatile portion of memory 36 described above with reference to FIG. 2. In some cases, the stored identifier may be used for encoding or addressing wireless messages output by the wireless output 42 described above, such that the messages are not discernible to recipients other than the robot 18 corresponding to the wireless identifier (e.g., embodiments may include the additional actions of encoding a message with such an identifier and transmitting the encoded message to a robot, or receiving an encoded message from a robot and decoding the message with the identifier).

Some embodiments may support other types of pairing between the robot and the robot controller 10, as indicated by blocks 63 and 66, which includes determining whether the robot has been connected to the controller 10 via a wired connection, such as USB in block 63. In response to determining that a wired connection has occurred (or is extant), embodiments may proceed to receive the robot wireless identifier via a wired connection, as indicated by block 65 (e.g., as transmitted on the wire(s) by the robot to the controller). In some embodiments, a user may store the robot wireless identifier on a flash drive, couple the flash drive via a USB connection of the robot controller 10, and insert the flash drive into the controller 10 in block 66. In response, or upon the appropriate command, embodiments may read the the wireless identifier from the inserted flash drive, as shown in block 67. Upon reading a wireless identifier (e.g., either through a wired connection or a flash drive (which is not to suggest that these two categories of connections are mutually exclusive), the wireless identifier may be stored in memory, as indicated by block 68 described above.

In some embodiments, either after (e.g., in response to) reading a wireless identifier by any method described above, or after (e.g., in response to) determining that no new wireless identifier is being read, embodiments may attempt to initiate the wireless connection with the robot associated with the wireless identifier stored in non-volatile portion of memory 36 of FIG. 2, as shown in 69. If the connection is successful in 70, some embodiments of the controller 10 may indicate a successful connection status with indicator 30 of FIG. 1, and controller 10 may then proceed to operate the remote robot according to FIG. 4 as indicated by 71 and shown as sub-process 72 of FIG. 4. Otherwise, in some embodiments, the controller 10 will continue to monitor for new wireless identifiers while continuing to attempt connection to the last stored wireless identifier.

FIG. 4 shows an example sub-process 72, which may be part of some embodiments of process 60 for a controller 10, for execution by controller 10 after a wireless connection has been established with the robot (e.g., with the steps depicted in FIG. 3). In this example, the controller 10 may receive a push-to-start command 73 from the user indicating the user's desire to start the program on the robot. The controller, in some embodiments, may translate 74 this command to a suitable command understandable (e.g., indicating a command supported) by the robot and transmit the command to the robot, as shown by 81.

In some embodiments, if a push-to-start command is not received, the controller 10 may check for a release command from the user 75. If the release command is received from the user, it is translated 76 and then sent to the robot 81. If a push-to-start command is not received, the controller 10 checks for receipt of a kill command from the user 77. If received, the kill command is translated 78 and sent to the robot 81.

In some embodiments, if no other commands are received, the controller 10 will determine if joystick commands or position information has been received from the user's joystick movements (14 of FIG. 1). If movements or commands were received 79, the commands and movements may be translated to commands and movements suitable for the robot 80, and transmitted to it 81.

In some embodiments, if no commands above were received by the controller 10, and if a user configurable threshold of time has elapsed since the last command was received 83, the embodiments may enter power-down mode to save battery power. In some embodiments, the duration of time is user configurable. In some cases, entering the power-down mode may include taking a variety of steps to reduce energy consumption, including terminating a wireless connection session between the robot and the robot controller, adjusting a beaconing or beacon sensing frequency for wireless communications, adjusting or terminate polling of the input module 38 for new commands, or otherwise taking steps to reduce or stop power consumption by the robot controller 10.

The collection of translations described above are grouped into switchable personalities 82 that could be configured for the controller 10 to interface to different robots. Personalities may include identifying the corresponding robot-protocol command set based on a mapping stored in memory 36 of input command digital codes to output command digital codes with the protocol translator 40. In some cases, the translation of commands may be characterized as occurring at the application layer of the Open Systems Interconnection (OSI) model, which in some embodiments, may be distinct from lower layer protocols, such as those associated with the wireless protocol by which the wireless output 42 communicates with the wireless interface 52 described above.

After processing commands (e.g., all commands), if any, embodiments may check that the wireless connection is still valid 85 through controller 42 and if so, further commands may be processed. If the wireless connection as become inactive, then the controller 10 may indicate the condition through 30. Then the controller may cycle back to attempting to re-initiate wireless contact and/or reading new a wireless identifier 87.

Thus, some of the above-described embodiments may provide for a relatively small, inexpensive, simple and reliable device for wirelessly interfacing between hand-held game controllers (or other user interfaces) and robots, such as those used in competitions. Some embodiments may be distinguished from laptops, desktop computers, tablet computers, and cell phones by the absence of an operating system, drivers for the operating system to communicate with peripherals, a keyboard, a trackpad or mouse, a screen, or a cellular interface. (Though, other embodiments may also include some of these features.) Further, embodiments may facilitation use of the same code during competition and testing by more accurately simulating competition start signals, and embodiments may support user-configurable profiles and settings that accommodate particular aspects of robots competition and educational environments. Again, however, not all embodiments necessarily provide all of these benefits, as some embodiments may address only some of these issues while not addressing others for in view of various engineering and cost tradeoffs.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A device configured to interface between a game controller and a robot suitable for competition, the device comprising:
   a case sized to fit in a user's hand;
   a battery;
   a printed circuit board having less than 20 square inches of area and four or fewer layers of conductive traces;
   two chorded input buttons that correspond to different commands depending on whether multiple buttons are pressed concurrently or individual buttons are pressed;
   a speaker and one or more lights that operate as a user interface of the device;
   a 16-bit or smaller microprocessor configured to operate at 64 megahertz or slower consuming less than 300 milliamps of current;
   a wireless interface;
   memory storing instructions that when executed by the microprocessor cause the device to translate commands from a hand-held game controller into a protocol suitable for a competition robot, the instructions providing for modules comprising:
   an input module configured to poll periodically memory in which digital signals from the hand-held game controller are stored to identify new commands;
   a protocol translator configured to identify a stored translation profile and translate identified commands into a protocol to which the robot is responsive based on a mapping of input command codes to output command codes; and
   a wireless output module configured to cause the wireless interface to wirelessly transmit the translated commands to the robot such that the robot executes the commands,
   wherein the device is a hand-held portable battery powered device that does not have an operating system or display screen.

2. The device of claim 1, wherein
   the instructions provide for modules consisting essentially of:
      the input module;
      the protocol translator, the protocol translator having means for translating input command codes to output command codes;
      the wireless output module; and
      means for providing a user interface via the speaker and one or more lights,
   the battery is configured to deliver 10 volts or less of voltage and 1200 milliamper-hours or less of charge,
   the memory comprises less than 256 kilobytes, and
   the device uses less than 250 ma power when controlling the robot.

3. A device for wirelessly controlling robots, the device comprising:
   an input module configured to receive commands from a human user interface, the human user interface sending signals indicative of inputs by a user to control a robot;
   a protocol translator configured to translate the received commands into a protocol to which the robot is responsive;
   a wireless output module configured to wirelessly transmit the translated commands to the robot such that the robot executes the commands, wherein the device is a dedicated controller that is not a general purpose computer; and
   a switch that, when selected, causes a wireless start signal to be sent by the wireless output module, wherein the wireless start signal simulates a wireless signal transmitted by an operator of a robotics competition, the operator being different from a competitor using the device, according to a competition protocol that precludes driving an actuator of the robot before the operator of the robotics competition transmits the signal being simulated, and wherein the wireless start signal is configured to cause the robot to determine that a wait-for-start condition that precedes physical actions involving actuators has been satisfied, such that the same code used in competitions under the control of an operator and a competitor is used in testing in the absence of the operator of the robotics competition transmitting the wireless start signal;
   wherein the switch is one of only two user-selectable buttons on the device.

4. The device of claim 3, wherein the device comprises:
   another human user interface configured to receive a start command and a kill command respectively indicating the start and end of a robotics competition;
   wherein the protocol translator is further configured to translate the start and kill commands to the protocol to which the robot is responsive, wherein the robot is immobile prior to receipt of the translated start command and is mobile after receipt of the translated start command.

5. The device of claim 3, wherein the device comprises:
   a chassis sized to fit in the user's hand; and
   a battery.

6. The device of claim 3, wherein the protocol translator comprises:
   memory mapping commands conveyed via USB from a joystick to the input module to translated commands conveyed via Bluetooth to the robot.

7. The device of claim 3, wherein the wireless output module comprises:
   non-volatile memory configured to store an identifier of the robot and a pairing state indicative of whether the device is wirelessly paired with the robot;
   a light; and
   a light-controller coupled to the light and configured to indicate the pairing state with the light.

8. The device of claim 3, wherein the protocol translator is configured to periodically poll the input module to determine whether a command has been received.

9. The device of claim 8, wherein the protocol translator is configured to stop polling after more than a threshold duration of time passes without a command being received.

10. The device of claim 3, comprising:
    a wired interface configured to communicate with the robot via a cable, wherein the output module is operative to pair with the robot via the cable and wirelessly communicate with the robot after pairing.

11. The device of claim 3, wherein the device has a processor configured to operate at a clock speed of less than 64 MHz.

12. The device of claim 3, wherein the device does not have a display configured to present a graphical user interface.

13. The device of claim 3, wherein the device uses less than 250 ma power when controlling a robot.

14. The device of claim 3, wherein the protocol translator comprises:
    memory mapping commands conveyed via USB from a joystick to the input module to translated commands conveyed via wireless communication to the robot.

15. The device of claim 3, wherein the protocol translator is configured to translate a robot-routine-start command into a translated command to be conveyed wirelessly by the wireless output module to the robot that, when received, causes the robot to execute a pre-configured routine stored in memory of the robot.

16. The device of claim 3, comprising a kill switch, wherein the protocol translator is configured to translate a kill switch command into a translated command to be conveyed wirelessly by the wireless output module to the robot that, when received, causes the robot to stop executing a routine.

17. The device of claim 3, wherein the input module is operative to couple to a serial interface, receive device configuration commands, and change configuration values in memory in response to the device configuration commands.

18. The device of claim 3, wherein the input module is operative to couple to a flash drive, retrieve from the flash drive device configuration commands, and change configuration values in memory in response to the device configuration commands.

19. The device of claim 3, wherein the command translator comprises memory storing a plurality of robot command protocols, each robot command protocol corresponding to a different robot having a different hardware control system, software control system, dynamic mechanical properties, or a combination thereof.

20. The device of claim 3, wherein the command translator is configured to translate a mode command from the input module into a command that selects a competition run-time configuration on the robot, the run time configuration being a configuration in which the robot operates in an autonomous mode or in a tele-operated mode.

21. The device of claim 3, wherein the command translator comprises a user-accessible lag-value memory and is configured to delay a transmission of commands by an amount of time corresponding to a lag value stored in the lag-value memory to simulate lags that occur during robotics competitions for training human operators.

22. The device of claim 3, wherein the wireless output module is coupled to two switches, and wherein the wireless output module is configured to enter a pairing mode for Bluetooth pairing with a robot in response to both switches being operated at the same time.

23. The device of claim 3, wherein the protocol translator is configured to translate a break-point command into a translated command to be conveyed wirelessly by the wireless output module to the robot that, when received, causes the robot to advance from a debug-break point in a routine being executed by the robot.

24. The device of claim 3, comprising a power-management module and a clock, wherein the power management module is configured to turn off the device in response to the clock indicating that more than a threshold amount of time has elapsed since a command was received.

25. The device of claim 3, wherein the wireless output module comprises a user-accessible broadcast-power memory and a broadcast power controller operative to adjust broadcast power of the wireless output module based on a value stored in the broadcast-power memory.

* * * * *